(12) United States Patent
Bian et al.

(10) Patent No.: US 6,174,582 B1
(45) Date of Patent: Jan. 16, 2001

(54) THIN FILM MAGNETIC DISK HAVING REACTIVE ELEMENT DOPED REFRACTORY METAL SEED LAYER

(75) Inventors: Xiaoping Bian, San Jose; Shanlin Duan, Fremont; Jinshan Li, Newark; Mohammad Mirzamaani, San Jose, all of CA (US)

(73) Assignee: International Business Machines Corporation, Armonk, NY (US)

( * ) Notice: Under 35 U.S.C. 154(b), the term of this patent shall be extended for 0 days.

(21) Appl. No.: 09/020,151

(22) Filed: Feb. 6, 1998

(51) Int. Cl.$^7$ ..................................................... G11B 5/66
(52) U.S. Cl. ................. 428/65.3; 428/65.7; 428/694 TS; 428/611; 428/336; 428/900; 204/192.2
(58) Field of Search .............................. 428/694 TS, 611, 428/336, 900, 65.3, 65.7; 204/192.2

(56) References Cited

U.S. PATENT DOCUMENTS

| | | | |
|---|---|---|---|
| 3,663,408 | 5/1972 | Kumagai et al. | 204/192.15 |
| 3,664,943 | 5/1972 | Kumagai et al. | 204/192.15 |
| 3,847,658 | 11/1974 | Kumagai | 428/432 |
| 4,245,008 | 1/1981 | Michaelsen et al. | 428/611 |
| 4,632,883 | * 12/1986 | Howard et al. | 428/611 |
| 4,833,020 | 5/1989 | Shiroishi et al. | 428/336 |
| 5,221,449 | * 6/1993 | Colgan et al. | 204/192.15 |
| 5,281,485 | * 1/1994 | Colgan et al. | 428/457 |

OTHER PUBLICATIONS

Lee et al., "Seed layer induced (002) crystallographic texture in NiAl underlayers", J. Appl. Phys. 79 (8), Apr. 15, 1996, pp. 4902–4904.

Matsuda et al., "Reduction of Co–Cr–Pt media noise by addition of Ti to Cr underlayer", J. Appl. Phys. 78 (8), Apr. 15, 1996, pp. 5351–5353.

Kataoka et al., "Magnetic and Recording Characteristics of Cr, Ta, W and Zr Pre–Coated Glass Disks", IEEE Trans. on Magnetics, vol. 31, No. 6, Nov. 1995, pp. 2734–2736.

Tang et al., "High Coercivity and Low Noise Media Using Glass Substrate", IEEE Trans. on Magnetics, vol. 30, No. 6, Nov. 1994, pp. 3963–3965.

Kotaoka, "Magnetic and Recording, " IEEE Transactions on Magnetics, vol. 31, No. 6, Nov. 1995.*

* cited by examiner

Primary Examiner—Leszek Kiliman
(74) Attorney, Agent, or Firm—G. Marlin Knight

(57) ABSTRACT

A method of fabricating a thin film magnetic disk including depositing a seed layer of a refractory metal such as tantalum, Cr, Nb, W, V, or Mo and a reactive element such as N or O; depositing a nonmagnetic underlayer onto the seed layer; and depositing a magnetic layer is disclosed. Also disclosed is a thin film magnetic disk having a substrate; a seed layer comprising tantalum and at least about 1 atomic-% of nitrogen or oxygen; an underlayer comprising Cr or an alloy of chromium deposited onto the seed layer, the underlayer preferably having a preferred orientation of [200]; and a magnetic layer deposited onto the underlayer, the magnetic layer preferably having a preferred orientation of [11$\bar{2}$0]. Also disclosed is a disk drive using the thin film magnetic disk of the invention.

29 Claims, 2 Drawing Sheets

THIN FILM MAGNETIC DISK HAVING REACTIVE ELEMENT DOPED REFRACTORY METAL SEED LAYER

RELATED APPLICATION

Commonly assigned U.S. patent application Ser. No. 08/838,376 filed on Apr. 8, 1997, entitled "Thin Film Magnetic Disk with CoPtCrB Layer" includes information on a tantalum seed layer.

FIELD OF THE INVENTION

This invention relates generally to the field of data storage devices such as disk drives having thin film magnetic disks. More particularly, the invention relates to methods for fabricating thin film magnetic disks from nonmetallic substrates using a seed layer.

Background of the Invention

The thin film magnetic recording disk in a conventional hard disk drive assembly typically consists of a rigid substrate, an underlayer of chromium (Cr) or a Cr-alloy, a cobalt-based magnetic alloy deposited on the underlayer, and a protective overcoat over the magnetic layer. A variety of disk substrates such as NiP-coated Al—Mg, glass, glass ceramic, glassy carbon, etc., have been used. The microstructural parameters of the magnetic layer, i.e., crystallographic preferred orientation (PO), grain size and magnetic exchange decoupling between the grains, play key roles in controlling the recording characteristics of the disk. The Cr underlayer is mainly used to control such microstructural parameters as orientation and grain size of the cobalt-based magnetic alloy. When the Cr underlayer is deposited at elevated temperature (>150° C.) on a NiP-coated Al—Mg substrate a [200] preferred orientation is usually formed. This preferred orientation promotes the epitaxial growth of [11$\bar{2}$0] PO of the cobalt (Co) alloy, thereby improving the in-plane magnetic performance of the disk.

The use of glass substrates gives improved shock resistance and allows thinner substrates to be used. However, media fabricated glass substrates may have higher noise compared with those made on NiP-coated Al—Mg substrates under identical deposition conditions. The reason is that the nucleation and growth of Cr or Cr-alloy underlayers on glass and most non-metallic substrates differ significantly from those on NiP-coated Al—Mg substrate. It is for this reason that an initial layer on the substrate called a seed layer is used. The seed layer is formed between the alternate substrate and the underlayer in order to control nucleation and growth of the Cr underlayer and, therefore, the magnetic layers. Several materials have been proposed in the prior art as candidates for seed layers such as: Al, Cr, Ti, Ni$_3$P, MgO, Ta, C, W, Zr, AlN and NiAl on glass and non-metallic substrates. (See for example, Seed Layer induced (002) crystallographic texture in NiAl underlayers, Lee, et al., J. Appl. Phys. 79(8), April 1996, p.4902ff).

In order to control nucleation and growth of the Cr underlayer on alternate substrates, a variety of seed layers have been reported. H. Kataoka, et al., have reported that the deposition of a tantalum seed layer on glass substrates promotes the [200] orientation in the Cr underlayer which, in turn, promotes the [11$\bar{2}$0] PO orientation in the magnetic layer. (IEEE Trans. Magnetic. 31(6), Nov. 1995, p.2734ff). They compared Cr, Ta, W and Zr for use as seed layers using a fixed underlayer and magnetic layer. The magnetic alloy used in their study was a 27 nm thick ternary CoPtCr alloy. The underlayer was CrTi and was 100 nm thick. The purpose of adding Ti was to increase the lattice spacing for optimum matching with CoCrPt.

One method for improving the recording performance of a magnetic disk medium is the use of a CrTi underlayer, which was suggested by Michaelsen, et al. in U.S. Pat. No. 4,245,008. Matsuda, et al., also reported that the addition of Ti to Cr increases the lattice parameters of the Cr to enhance the epitaxial growth of the magnetic layer. (J. Appl. Phys. 79, pp. 5351–53 (1996)). They have also reported that the grain size of CrTi underlayer decreases with increasing the Ti concentration. It should be noted that although sputtered Ti has usually a very small grain size, it is not suitable for use as an underlayer or a seed layer as it promotes the <0001> orientation in the magnetic layer, thereby making it unsuitable for longitudinal recording.

Another means of affecting the crystal lattice orientation of the magnetic layer is to alter the character of the seed layer. For example, Magnetic and Recording Characteristics of Cr, Ta, W, and Zr Precoated Glass Discs, (IEEE Transactions on Magnetics, Vol. 31 No. 6, 1995, p. 2734) discloses depositing a Cr, Ta, W, or Zr pre-coat layer or seed layer with a thickness between 10 and 100 nm on a glass discussed followed by depositing a CrTi layer and a CoCrPt magnetic layer. The article discusses coercivity, coercive squareness and signal to noise ratio with different layer compositions. The seed layer was deposited using an in-line sputtering system with DC magnetron sources.

High Coercivity and Low Noise Media Using Glass Substrate, (IEEE Transactions on Magnetics, Vol. 30, No. 6, 1994, p. 3963) discloses depositing a thin film of NiP$_3$, TiSi2, Cr or C as a reactive layer before depositing conventional magnetic alloys. U.S. Pat. No. 4,632,883 to Howard et al. shows depositing a NiFe layer on a substrate to provide a magnetic flux return path. An underlayer of beta-Ta is deposited on the NiFe. A cobalt chromium tantalum magnetic layer is deposited on the underlayer.

U.S. Pat. Nos. 5,221,449 and 5,281,485 to Colgan et al., although not working in the magnetic disk field, show reactive sputtering of a Ta seed layer with thickness between 16 and 500C in a nitrogen containing environment and forming layers of alpha-Ta on the seed layer. After the Ta(N) layer is deposited, an "tantalum layer is deposited on the Ta(N) layer to form the actual seed layer.

U.S. Pat. Nos. 3,847,658; 3,664,943; and 3,663,408 to Kumagia et al. also not working in the magnetic disk field, disclose forming nitrogen doped beta tantalum resistor films using plasma sputtering The deposition takes place in a mixture of nitrogen and argon. The substrate is presputtered in a gaseous mixture prior to main sputtering, during which time the substrate is heated. The resulting resistor film has a resistance which is dependent upon the substrate temperature.

SUMMARY OF THE INVENTION

The invention provides a method of fabricating a thin film magnetic disk, comprising the steps of sputtering a seed layer of a refractory metal such as tantalum and a non-inert element such as nitrogen or oxygen; depositing a nonmagnetic underlayer onto the seed layer; and depositing a magnetic layer onto the underlayer.

In accordance with a further aspect of the invention of thin film magnetic disk is provided comprising: a substrate; a seed layer comprising a refractory metal such as tantalum deposited onto the substrate, the seed layer comprising at least 1 atomic-% of a second element such as nitrogen or oxygen; an underlayer comprising chromium or an alloy of chromium deposited onto the seed layer, the underlayer having a preferred orientation of [200]; and a magnetic layer deposited onto the underlayer, the magnetic layer having a [11$\bar{2}$0] PO.

By deposition of a refractory metal seed layer and a second reactive element, a magnetic thin film disk with high coercivity and improved longitudinal performance can be manufactured.

The seed layer may be used on metallic or non metallic substrates. The use of glass substrates is desired for improved shock resistance and to allow the usage of a thinner substrates. For optimum performance of a thin film magnetic disk on a glass substrate, for example, it is necessary to deposit a proper seed layer prior to deposition of the underlayer to promote the desired nucleation and crystallographic orientation of the Cr underlayer and the magnetic layer. This invention provides a seed layer, which is a thin layer of M(x), (preferably 10–30 nm in thickness), where M is a refractory metal with a high affinity to N with a structure similar to Ta, Nb, V, W, Mo or Cr; and x is a reactive element such as nitrogen or oxygen. When the second element is available in a gas form it may be introduced into the sputtering chamber along with the working gas which is typically argon. The sensitivity of the disk characteristics to variations in sputtering equipment and conditions is reduced with the use of the M(x) seed layer of the invention and therefore the manufacturability of the disk is improved.

In accordance with another aspect of the invention, a disk drive is provided including the thin film magnetic disk of the invention.

DETAILED DESCRIPTION OF THE PREFERRED EMBODIMENTS

The invention provides a method of fabricating a thin film magnetic disk, including sputtering a seed layer containing a refractory metal and a non-inert element; depositing a nonmagnetic underlayer onto the seed layer; and depositing a magnetic layer. The resulting thin film magnetic disk generally includes a substrate, a seed layer comprising a refractory metal such as tantalum deposited onto the substrate, the seed layer also comprising at least 1 atomic-% of the second element; an underlayer comprising Cr or an alloy of chromium deposited onto the seed layer, the underlayer having a preferred orientation of [200]; and a magnetic layer deposited onto the underlayer, the magnetic layer having a preferred orientation of [11$\bar{2}$0].

Figure 1:
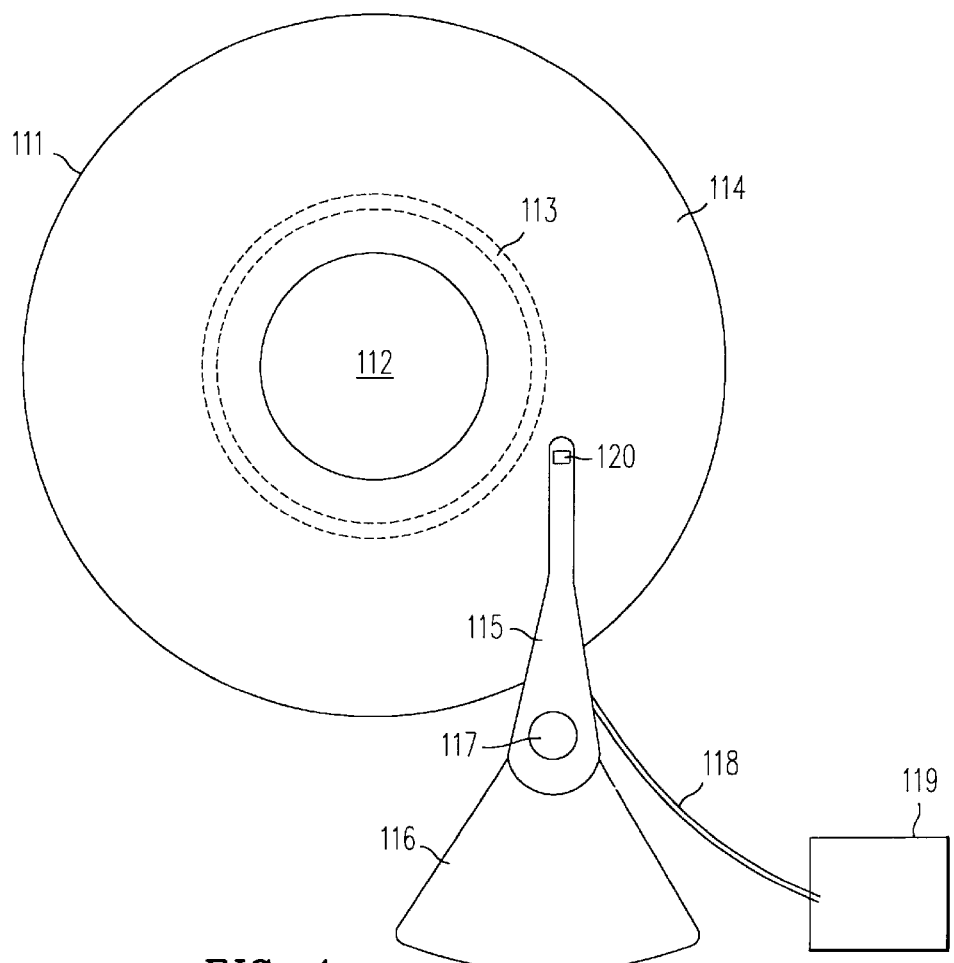
FIG. 1 illustrates a top view of a prior art disk drive with a rotary actuator useful in practicing the present invention.

The invention may be used with a variety ot thin film magnetic disks and disk drives. For example, FIG. 1 is a top view illustrating a typical disk drive with a rotary actuator useful in practicing the present invention. The system comprises one or more magnetic recording disks 111 mounted on spindle 112 which is rotated by an in-hub electrical motor (not shown). An actuator assembly 115 supports a slider 120 which contains one or more read/write heads. The read head for use with the seed layer of the invention is preferably a magneto-resistive (MR) head. The assembly may be composed of a plurality of actuators and sliders arranged in a vertical stack with the actuators supporting the sliders in contact with the surfaces of the disks when the disks are not rotating or being unloaded to avoid contact.

A voice coil motor (VCM) 116 moves the actuator assembly 115 relative to the disks by causing the assembly to pivot around shaft 117. The heads are typically contained in air bearing sliders adapted for flying above the surface of the disks when rotating at sufficient speed.

In operation, when the sliders are flying above the disks the VCM moves the sliders in an arcing path across the disks allowing the heads to be positioned to read and write from circular tracks formed in the data area 114 which is coated with the thin films which will be described in more detail below. Electrical signals to and from the heads and the VCM are carried by a flex cable 118 to the drive electronics 119. When not operating and during periods when the rotation of the disks is either starting or stopping, the sliders may be positioned in physical contact with the surface of the disks in a landing zone or contact start/stop (CSS) area 113 which is not used for data storage even though the magnetic coating extends over this area. It is also known to remove the sliders from the disks during nonoperating periods using an unload ramp. Although the disk drive has been described with air bearing sliders the disk of the present invention may easily be used in other storage devices having near contact, or contact recording heads.

Figure 2:
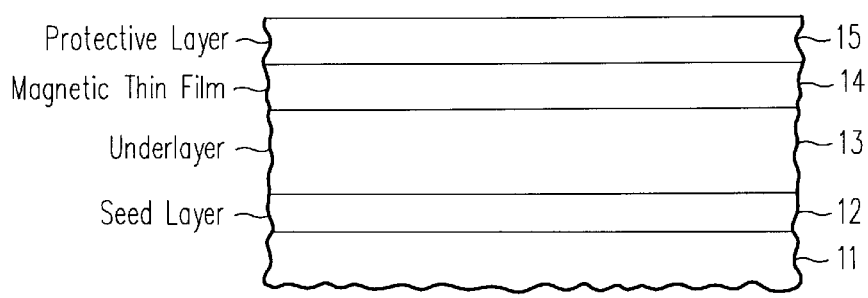
FIG. 2 illustrates the layer structure of a thin film magnetic disk according to the invention.

FIG. 2 illustrates the cross sectional layer structure of a thin film magnetic disk embodiment according to the invention which will be coated onto at least one and preferably both planar surfaces of the disk to form the data recording area. The shading is used only to differentiate the layers and not to indicate color or specific composition. The substrate 11 is preferably made of a non-metallic material such as ceramic, glass, and mixtures thereof or any comparable material. The M(x) seed layer 12 is deposited directly onto the substrate. The following discussion will focus on the preferred embodiment of the seed layer of the invention which is Ta(N). The underlayer 13 is deposited onto the seed layer. The ferromagnetic layer 14 is deposited onto the underlayer. The Ta(N) seed layer is compatible with any of the cobalt alloy magnetic layers which are currently in use in the industry, but the applicants prefer the ferromagnetic layer 14 to be an alloy of cobalt, platinum, chromium, tantalum, or boron. It is known in the art to include multiple magnetic layers and/or multiple underlayers. A disk with laminated magnetic layers might typically have each magnetic layer separated by a thin layer of material of the type used for underlayers, e.g. Cr. The top layer of commercial thin film disks is typically a protective overcoat 15 such as carbon with hydrogen and/or nitrogen. The use and/or composition of the overcoat are not critical in practicing the invention. Layers 13, 14, and 15 are preferably sputter deposited using standard techniques, targets, temperatures and pressures.

The relative thicknesses of the layers are not believed to be critical for practicing the invention, but the following ranges are given as guidance. The seed layer is preferably from about 5 to 30 nm thick, more preferably from about 10 to 30 nm thick. Underlayers are typically thicker than the seed layer, but wide variations in the thickness of the underlayer result in only small changes in the magnetic characteristics of the disk. A typical value for the thickness of the underlayer is 50 nm. The ferromagnetic layer is typically from 10–30 nm thick. A typical thin film disk might use an overcoat less than 15 nm thick.

The underlayer is preferably CrTi, but other suitable materials such as Cr or other chromium alloys may be used. The CrTi underlayer composition is preferably about 5 to 25 atomic percent (at. %) Ti and the balance Cr. The addition of Ti serves as a grain refiner while also preferably providing a suitable lattice match with the ferromagnetic layer 14.

Glass and ceramic substrates 11 are becoming more desirable due to their high impact strength. The use of these substrates, in turn, requires that some provision is made for depositing a ferromagnetic layer 14 which has a c-axis preferred orientation. The use of a Ta seed layer has been found to be beneficial in the past, in that it promotes the [200] orientation in the Cr and thus the [11$\bar{2}$0] PO in the magnetic layer. More information on the use of the Ta seed layer is found in commonly assigned U.S. patent application Ser. No. 08/838,376 filed on Apr. 8, 1997, entitled "Thin Film Magnetic Disk with CoPt Cu Layer." However, these preferred orientations are not easily obtained and tend to depend heavily on the variables such as the particular sputtering tool being used.

In one embodiment of the invention the gases in the chamber are altered to include nitrogen (and/or oxygen) during sputtering of tantalum, the resulting seed layer induces a [200] preferred orientation in the underlayer and, in turn, the formation of a ferromagnetic layer having a [11$\bar{2}$0] PO orientation under a wider range of conditions than is possible using tantalum alone. The non-inert gas(es) are preferably used at a level of at least about 0.6% by volume of gas entering the chamber. Argon is typically the primary gas component used in sputtering. In addition to Ta, the refractory metals such as Cr, Nb, V, W and Mo which have a high affinity to nitride and a structure similar to Ta, should produce similar results. While N and O can conveniently be introduced into sputtering chamber as gases, the metals are more conveniently derived from solid targets. It may also be possible to use more than one reactive element simultaneously. Oxides of the reactive metallic elements should also be considered as potential target materials. For example, tantalum oxide targets could be considered. It is preferable, however, to use gas for the reactive elements for ease of control of the concentrations.

In forming the seed layer 12, conventional sputtering processes and tools may be used. The thickness of the film may range from about 5 to 40 (nm). For the nitrogen case the seed layer may have a nitrogen concentration of about 10 to 50 atomic-%, and more preferably from about 20 to 30 atomic-%. The resulting Ta(N) seed layer is not believed to be crystalline, but rather microcrystalline or amorphous.

The Ta(x) seed layer promotes the formation of a [200] preferred orientation in the Cr underlayer, which in turn promotes a magnetic layer having a [11$\bar{2}$0] PO. Generally, any sputtering tools known to those of skill in the art may be used to deposit the seed layer and the other thin films, but some typical parameters for sputtering the seed layer 12 may be found in Table 1 below:

Table 1

Reaction Parameters

| PARAMETER | USEFUL | PREFERRED | MORE PREFERRED |
|---|---|---|---|
| Temperature (° C.) | 150–330 | 200–310 | 210–250 |
| Sputter Rate (Å/minimum.) | 3–100 | 10–80 | 25–50 |

Table 1-continued

Reaction Parameters

| PARAMETER | USEFUL | PREFERRED | MORE PREFERRED |
|---|---|---|---|
| Pressure (mTorr) | 3–40 | 4–25 | 7–15 |
| N$_2$ Partial Pressure (mTorr) | 0.1 to 2 | 0.2 to 1.5 | 0.3 to 0.9 |

EXAMPLES

The following working and comparative examples provide a typical illustration of some of the advantages of the invention.

The seed layers were deposited on substrates in pure argon or in a mixture or argon and nitrogen, using tantalum targets in a commercially available Balzer's Circulus sputtering system. The percentage of nitrogen in the sputtering gas was altered from 0.6 to 3.3%. These percentages are based on volume of gas flow into the chamber. The resulting seed layers could contain up to 40 at. % of nitrogen, depending on the range of deposition parameters. Cr underlayers, Co alloy magnetic layers, and carbon based overcoat protection layers were then deposited on the substrates using the same tool. The substrates all had the configuration schematically illustrated in FIG. 2.

Figure 3:
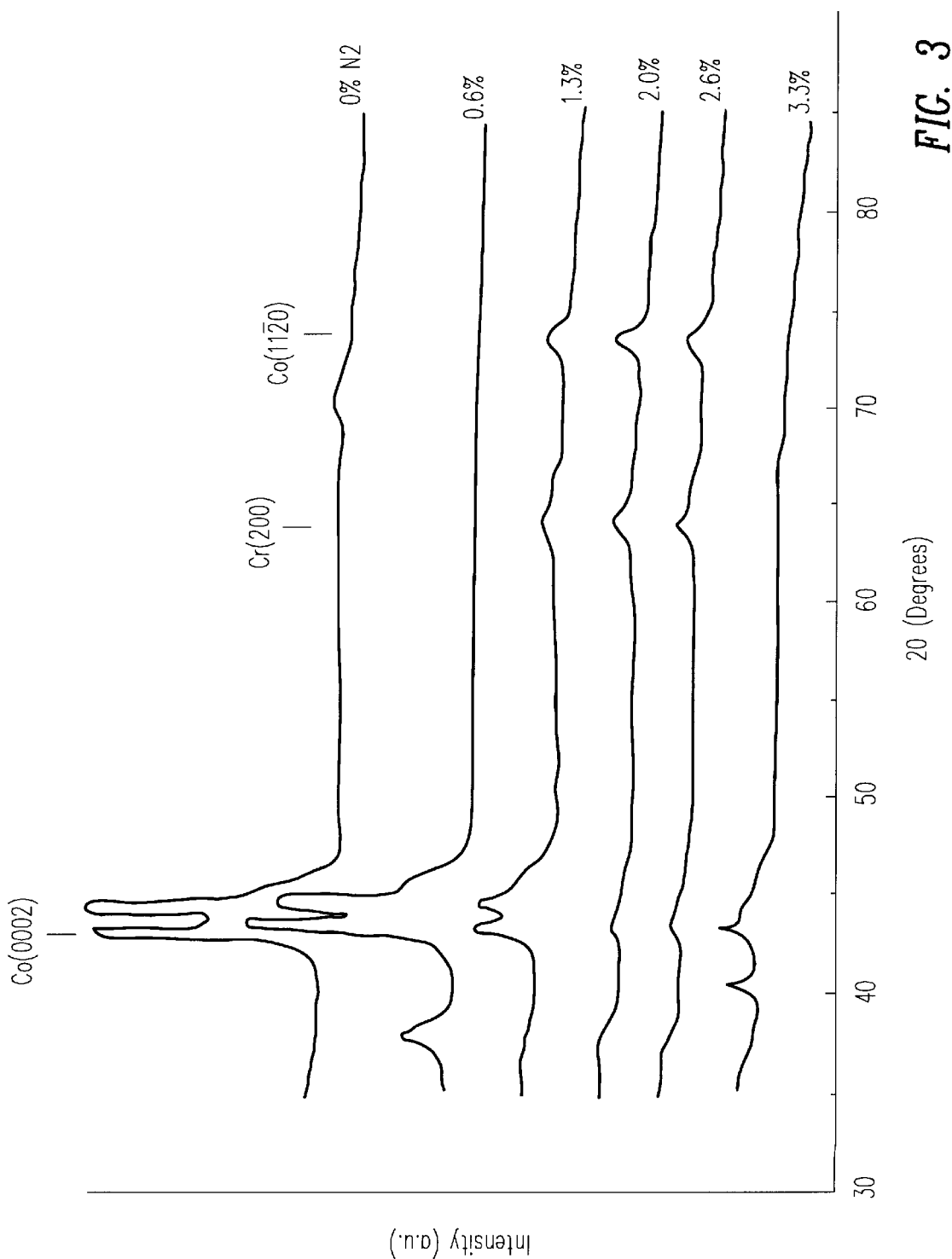
FIG. 3 is a graphical depiction of X-ray diffraction data obtained from the Working Example.

After processing, the crystallography of the five disks was investigated using X-ray diffraction, and the results are illustrated in FIG. 3. The pure Ta seed layer disk showed a pronounced Co(0002) while showing essentially no Cr(200) or Co(11$\bar{2}$0). The graph shows that as the nitrogen flow was increased to 0.6%, 1.3%, 2.0%, and 2.6% the Co(0002) peak reduced to a minimal level while the Cr(200) and Co(11$\bar{2}$0) peaks increased. At 3.3% nitrogen flow the tend reversed. Thus, adding nitrogen up to some maximum level during deposition of the Ta(N) seed layer clearly enhances the Cr(200) and Co(11$\bar{2}$0) orientations under the given conditions.

The coercivity (Hc) coercive squareness (s*) signal to noise ratio (SoNR) pulse width (PW50), and resolution (Respectfully ) of the five disks were measured. The results are shown in Table 2, together with the corresponding results for a sputtered seed layer without nitrogen. Coercivity, signal to noise ratio, pulse width, and resolution are clearly improved up through the 2.6% nitrogen flow level.

TABLE 2

| Seed Layer | % of N$_2$ in sputtering gas | Hc (Oe) | Mrt | S* | SoNR (dB) | PW50 | Res. |
|---|---|---|---|---|---|---|---|
| Ta | 0 | 1648 | .80 | .69 | 27.2 | 29 | 37.1 |
| Ta | 0.6 | 1820 | .79 | .76 | | | |
| Ta | 1.3 | 2100 | .82 | .78 | | | |
| Ta | 2.0 | 2180 | .84 | .89 | 28.5 | .29 | 44.7 |
| Ta | 2.6 | 2330 | .86 | .82 | 30.1 | .28 | 47.6 |

For reasons that are not well understood, the addition of N in the Ta seed layer for some types of sputtering systems, results in only a minor improvement. In these systems the pure Ta seed layer performs about as well as the best Ta(N). Since the Ta(N) seed layer in some systems had the effect of preventing degradation of the performance of the disks and did not degrade the performance in other systems, one benefit of including the Ta(N) seed layer in a disk design is that it makes the disk insensitive to differences in sputtering systems, whereas a pure Ta seed layer disk is quite sensitive. Similar performance is expected for the M(x) family of seed layers.

Although seed layers are typically associated with nonmetallic substrates, there is no reason in principle which prevents the use of the layer of the invention or any other seed layer on metal substrates.

While the compositions listed above have been given without regard to contamination percentages it is know to those skilled in the art that some contamination is normal if not always present in thin films. Targets are typically specified as 99.9% or greater purity, but the resulting films may have much lower purity due to contamination in the sputtering chamber or other factors. For example, contamination by air in the chambers might result in measurable amounts of oxygen and/or hydrogen being incorporated into the film. For some carbon films, for example, 5 at % hydrogen contamination has been measured in a typical sputtered layer. Contamination levels were not specifically measured in the disk samples described and, therefore, were assumed to be within normal ranges for sputtered thin film disks expected by those skilled in the art.

The thin film disk made according to the invention can be used for storing data in typical disk drives using either magnetoresistive or inductive heads and can be used in contact recording or with flyable heads. The read/write head is positioned over the rotating disk in the standard manner to either record or read data.

While the preferred embodiments of the present invention have been illustrated in detail, it will be apparent to the one skilled in the art that alternative embodiments of the invention are realizable without deviating from the scope and spirit of the invention.

What is claimed is:

1. A method of fabricating a thin film magnetic disk, comprising the steps of:
    (a) sputtering a seed layer comprising a refractory metal and at least 1 at % of a reactive element onto a substrate;
    (b) sputtering a nonmagnetic underlayer on to the seed layer said underlayer having preferred orientation of [200]; and
    (c) sputtering a magnetic layer having preferred orientation of [1120] on the underlayer.

2. The method of claim 1 wherein the refractory metal is tantalum and the reactive element is nitrogen.

3. The method of claim 2 wherein the seed layer comprises at least 1 at. % nitrogen.

4. The method of claim 2 wherein the step of sputtering a seed layer further comprises introducing nitrogen gas into the chamber with the nitrogen gas comprising at least 0.6% by volume of the total gas being introduced into the chamber.

5. The method of claim 1 wherein the refractory metal is tantalum and the reactive element is oxygen.

6. The method of claim 5 wherein the seed layer comprises at least 1 at. % oxygen.

7. The method of claim 6 wherein the step of sputtering a seed layer further comprises introducing oxygen gas into the chamber with the oxygen gas comprising at least 0.6% by volume of the total gas being introduced into the chamber.

8. The disk of claim 1 wherein the refractory metal is Cr, Nb, W, V, or Mo.

9. The method of claim 1 wherein the magnetic layer has a coercivity greater than 2000 Oe.

10. The method of claim 1 wherein the refractory metal is tantalum and reactive element is nitrogen, and the nitrogen comprises at least 0.6% by volume of a total volume of gas being introduced into the chamber; and the seed layer comprises at least 1 at. % nitrogen.

11. The method of claim 1, wherein the substrate is nonmetallic.

12. A thin film magnetic disk comprising:
    a substrate;
    a seed layer comprising a refractory metal deposited onto the substrate, the seed layer comprising at least 1 at. % of a second element;
    an underlayer comprising chromium or an alloy of chromium deposited onto the seed layer, said underlayer having a preferred orientation of [200]; and
    a magnetic layer having a preferred orientation of [11$\bar{2}$0].

13. The disk of claim 12 wherein the refractory metal is tantalum and the second element is nitrogen.

14. The disk of claim 13 wherein the underlayer contains greater than 5 at. % Ti with the remainder being predominantly Cr.

15. The disk of claim 12, wherein the refractory metal is Cr, Nb, W, V, or Mo.

16. The disk of claim 12, wherein the second element is oxygen.

17. The disk of claim 16, wherein the substrate comprises glass and the seed layer is between 5 and 30 nm in thickness.

18. The disk of claim 17 wherein the magnetic layer comprises 4 to 12 at. % platinum, 18 to 23 at. % chromium and 2 to 6 at. % tantalum or boron.

19. The disk of claim 17 wherein a substrate is nonmetallic and a SoNR is greater than 28 dB.

20. The disk of claim 17 wherein the coercivity is greater than 2000 Oe.

21. A disk drive comprising:
    a thin film magnetic disk, the disk comprising:
        a nonmetallic substrate; a seed layer deposited onto the substrate, the seed layer comprising a refractory metal and at least 1 at. % of oxygen or nitrogen; an underlayer comprising, chromium or an alloy of chromium deposited onto the seed layer, the underlayer having a preferred orientation of [200]; and a magnetic layer having a preferred orientation of [11$\bar{2}$0];
    a motor for rotating the thin film magnetic disk; and
    a head for reading magnetic data; and
    an actuator for positioning the head over the thin film magnetic disk to read magnetic data from the disk.

22. The disk drive of claim 21, wherein the refractory metal is tantalum and the second element is nitrogen.

23. The disk drive of claim 21, wherein the refractory metal is tantalum and the second element is oxygen.

24. The disk drive of claim 21 wherein the refractory metal is Cr, Nb, W, V, or Mo.

25. The disk drive of claim 21 wherein the displayed layer is between 5 and 30 nm in thickness.

26. The disk drive of claim 21 wherein the thin film magnetic disk has a coercivity greater than 2000 Oe.

27. The disk drive of claim 23 wherein the underlayer comprises nonmagnetic alloy of Cr and Ti with greater than 5 at. % Ti and the magnetic layer comprises 4 to 12 at. % platinum, 18 to 23 at. % chromium and 2 to 6 at. % tantalum or boron.

28. The disk drive of claim 21 wherein the disk underlayer comprises nonmagnetic alloy of Cr and Ti with greater than 5 at. % Ti.

29. The disk drive of claim 21 wherein the disk substrate comprises glass; the seed layer is between 5 and 30 nm in thickness; the refractory metal is tantalum; the second element is nitrogen; the underlayer comprises an alloy of Cr and Ti with greater than 5 at. % Ti and the magnetic layer comprises 4 to 12 at.% platinum, 18 to 23 at. % chromium and 2 to 6 at. % tantalum or boron.

* * * * *